Nov. 7, 1950 — N. H. YOUNG, JR., ET AL — 2,528,569

VOLTAGE REGULATOR CIRCUIT

Filed June 22, 1946

INVENTORS
NORMAN H. YOUNG, JR.,
MARTIN SILVER
BY HAYWARD A. FRENCH

ATTORNEY

Patented Nov. 7, 1950

2,528,569

UNITED STATES PATENT OFFICE 2,528,569

VOLTAGE REGULATOR CIRCUIT

Norman H. Young, Jr., Jackson Heights, Martin Silver, Bronx, and Hayward A. French, Brooklyn, N. Y., assignors to Federal Telecommunication Laboratories, Inc., New York, N. Y., a corporation of Delaware Application June 22, 1946, Serial No. 678,546

5 Claims. (Cl. 323—22)

1

This invention relates to a voltage regulator circuit. More particularly, it deals with a circuit for compensating voltage fluctuations from a unidirection voltage source by correspondingly varying a resistance element in said circuit.

It is an object of this invention to remove fluctuations and ripple from a unidirectional voltage source in a simple and economical manner.

Another object is to produce a high steady direct current power supply voltage which will not be affected by changes in load or line changes.

Other objects will appear from time to time in the following description.

Generally speaking, this invention comprises (1) a voltage divider across the output terminals of a unidirectional voltage power supply, (2) an electron discharge tube serving as a variable impedance, called a rheostat tube, which is coupled in the lead to one of these terminals, and (3) a plural stage amplifier coupled between the divider and said rheostat tube. The rheostat tube has a control electrode or grid to which is applied a control voltage proportional to the fluctuation in the voltage across the output terminals. This control voltage is amplified from a corresponding fluctuation impressed across a portion of the voltage divider. The amplification of this fluctuation is obtained in at least two stages which are held at a predetermined fixed potential difference in bias by a constant voltage drop device, such as a glow tube, in a portion of said divider. If only two stages of amplification are used, a single double triode or similar type tube may be used.

These and other features and objects of this invention will become more apparent upon consideration of the following detailed description of an embodiment of the invention to be read in connection with the accompanying drawings in which.

Figure 1:
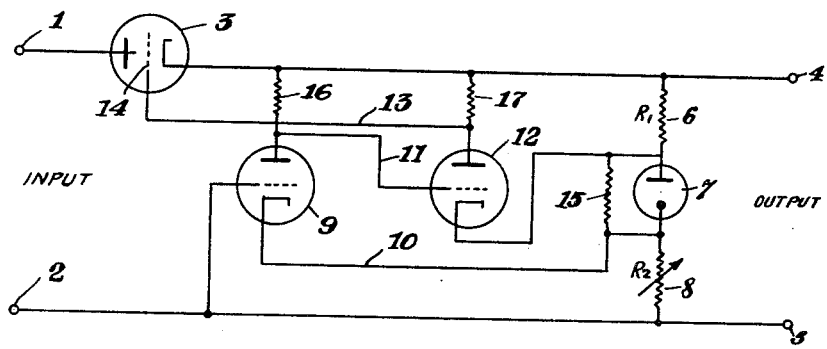
Fig. 1 is a schematic wiring diagram of a circuit embodying this invention.

Referring specifically to Fig. 1, the input from the unidirectional voltage power supply or source is connected across the terminals 1 and 2. One lead is coupled through a rheostat tube 3. The output terminals 4 and 5 are coupled to the electronic circuit to which the steady D. C. voltage is applied. In between these terminals there is provided the voltage regulating circuit of this invention which is coupled to the grid of the tube 3 for counter-acting any variations which may appear in the voltage between terminals 4 and 5.

This circuit comprises a voltage divider across the output terminals 4 and 5 comprising resist-

2 ance 6 and variable resistance 8 in series with a constant voltage gas filled tube 7. Across one of these resistors, namely 8, there is coupled an amplifier tube 9. The grid and cathode of the tube 9 are so connected across 8 that when a positive variation occurs in the voltage between terminals 4 and 5 there will be a proportionally small positive variation in the line 10. This small positive variation on the cathode of 9 will cause its grid to become more negative with respect to cathode in proportion to the original positive variation. This, in turn, produces a proportional positive variation in the line 11 which is applied to the grid of the second amplifier tube 12. The resulting positive variation on the grid of 12 will then cause a correspondingly amplified negative variation in line 13 from the plate of 12 which is applied to the grid 14 of the rheostat tube 3 to cause an increased potential drop across the rheostat tube 3. This increased drop acts to counteract the original positive variation assumed between terminals 4 and 5.

The cathode bias of the tube 12 is taken on one side of the tube 7 while the cathode bias of the tube 9 is taken on the other side of the tube 7. This is to provide a constant voltage difference between the cathodes of the tubes 9 and 12.

The very high resistor 15 across the tube 7 may be omitted if only a single tube 7 is employed. Resistor 15 then, is only inserted to aid in starting the tube, and may be ignored in the operation of the present circuit. However, if two or more such glow tubes are used in series, in place of the single one 7 shown, a resistor 15 shunted around one or more such tubes in series aids in causing all the tubes to fire at the same time and prevents only one tube firing. If, one of two or more tubes in series did not fire the circuit would be inoperative, in view of the fact that 7 would not be a constant voltage device, for which purpose it was inserted into the circuit.

The more tubes 7 which are provided in series in the voltage divider, comprising resistances 6 and 8, the greater is the variation applied to the amplifier tube 9. Since each one of the tubes is a constant voltage device, it will directly affect the same variation on each side thereof. For example, if another tube were provided in place of the resistor 6, an even greater proportion of the variation between 4 and 5 would be applied directly to the grid of the tube 9.

The resistances 16 and 17 in the plate circuits of the tubes 9 and 12 supply the plate potential for these tubes and are very high in value so that the amplification in the tubes 9 and 12 will be correspondingly high.

Figure 2:
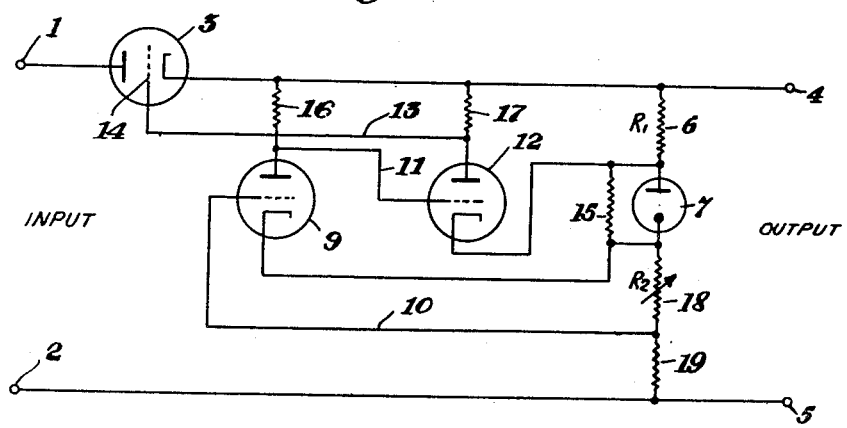
Fig. 2 is a modified schematic wiring diagram of the circuit in Fig. 1.

Referring to the modification shown in Fig. 2, there is a similar circuit to that in Fig. 1, except that the cathode and grid of the tube 9 are taken across the variable resistance 18 which is only a portion of the total voltage divider resistance between the tube 7 and output terminal 5. The only advantage of the circuit in Fig. 2 is that if very high output voltages are required the voltage variation may be taken off at a point along the voltage divider (comprising 6, 18, and 19) so that the operating voltages on the plates of two tubes 9 and 12 will be reasonable and not excessive (such as in the case of a 5000 volt output across 4 and 5). Accordingly, the plate load resistors 16 and 17 do not have to be of such tremendous values and normal commercially available amplifier tubes 9 and 12 may be used in the circuit.

The theory of operation of the circuit is as follows:

Assume that the voltage changes by an amount $+\Delta E$ across the output terminals 4 and 5. The portion of this differential voltage that appears between the cathode and grid of the first amplifier tube 9 will be:

$$+\left(\frac{R_2}{R_1+R_2}\right)\Delta E$$

and the grid of the tube 9 will go negative with respect to the cathode by this voltage. The voltage differential appearing between the cathode and plate of tube 9 will be approximately:

$$+\mu_1\left(\frac{R_2}{R_1+R_2}\right)\Delta E$$

Although the grid of the second amplifier tube 12 is connected to the plate of tube 9, the cathode of tube 12 has only increased in potential by the amount $$\left(\frac{R_2}{R_1+R_2}\right)\Delta E$$

with respect to ground, due to the constant voltage tube 7. Then, the differential voltage appearing between the grid and the cathode of tube 12 is:

$$+(\mu_1-1)\left(\frac{R_2}{R_1+R_2}\right)\Delta E$$

and that between the plate and cathode is approximately:

$$+\mu_2(\mu_1-1)\left(\frac{R_2}{R_1+R_2}\right)\Delta E$$

This voltage change makes the grid of the rheostat tube 3 become more negative with respect to its cathode, thus increasing its resistance and tending to cause the output voltage to return to normal.

A similar but reverse action takes place to stabilize the output voltage if the negative differential of output voltage is assumed.

This regulation will be good if the overall gain of the amplifiers 9 and 12 is much greater than unity, and greater than the ratio of the total output differential to that portion of this differential applied to the grid of the first amplifier 9.

While the above is a description of the principles of this invention in connection with specific apparatus and particular modifications thereof, it is to be clearly understood that this description is made only by way of example and not as a limitation on the scope of this invention as defined in the accompanying claims.

What is claimed is:

1. A voltage regulator circuit comprising a rheostat tube having a cathode and a plate in the circuit to be regulated and having a control grid, a constant voltage dropping device connected through a resistance on each side of the said device across the output of the said circuit, a first and second electronic tube, each tube having a cathode, a plate, and at least one control grid; the cathodes of the first and second tubes having connections to the negative and positive sides respectively of the constant voltage dropping device to maintain a constant potential difference between the two cathodes, means to bias the said first tube across one of said resistances between the constant voltage dropping device and the circuit to be regulated, the said second tube having its grid connected to plate of said first tube and having its plate connected to the control grid of the said rheostat tube and connected through a bias resistance to the cathode of the rheostat tube whereby any fluctuation in the voltage across the output of the said circuit is counteracted by a corresponding change in the resistance of the said rheostat tube.

2. A voltage regulator circuit comprising a rheostat tube having a cathode and a plate in the circuit to be regulated and having a control grid, a glow tube connected through a resistance on each side of said glow tube across the output of the said circuit, a first and a second electronic tube each having a cathode, a plate, and at least one control grid, the cathodes of said first and second tubes having connections to the negative and positive sides respectively of the glow tube to maintain a constant potential difference between the two cathodes, the plates of the said tubes having connections through separate resistors to the positive side of the said circuit, means to bias the first tube across one of the said resistances between the negative side of the glow tube and the circuit to be regulated, the said second tube having its grid connected to the plate of the first tube and having its plate connected to the control grid of the said rheostat tube whereby any fluctuation in voltage across the output of the said circuit is counteracted by a corresponding change in resistance of the said rheostat tube.

3. A voltage regulator circuit according to claim 1 wherein the said constant voltage dropping device comprises a glow tube.

4. A voltage regulator circuit according to claim 1 wherein the said resistance across which the said first electronic tube is biased comprises a manually variable resistor.

5. A voltage regulator circuit according to claim 1 wherein the said electronic tubes are combined into a single dual purpose electronic discharge tube.

NORMAN H. YOUNG, JR.
MARTIN SILVER.
HAYWARD A. FRENCH.

REFERENCES CITED

The following references are of record in the file of this patent:

UNITED STATES PATENTS

| Number | Name | Date |
|---|---|---|
| 2,075,966 | Vance | Mar. 11, 1937 |
| 2,210,393 | Braden | Aug. 6, 1940 |
| 2,274,364 | Gardiner | Feb. 24, 1942 |
| 2,301,343 | Tarr | Nov. 10, 1942 |
| 2,318,644 | Tubbs | May 11, 1943 |
| 2,443,534 | Eglin | June 15, 1948 |